United States Patent [19]

Masubuchi

[11] Patent Number: 4,652,912
[45] Date of Patent: Mar. 24, 1987

[54] MATRIX-TYPE COLOR PICTURE DISPLAY APPARATUS WITH FOUR-ELEMENT UNIT DISPLAYING PICTURE ELEMENTS EACH BEING DIVIDED INTO AT LEAST TWO UNIT DRIVING PICTURE ELEMENTS

[75] Inventor: Sadao Masubuchi, Tokorozawa, Japan

[73] Assignee: Citizen Watch Co., Ltd., Tokyo, Japan

[21] Appl. No.: 676,872

[22] Filed: Nov. 30, 1984

[30] Foreign Application Priority Data

Dec. 2, 1983 [JP] Japan ................................ 58-228239

[51] Int. Cl.[4] .......................... H04N 9/30; H04N 9/12
[52] U.S. Cl. .......................................... 358/59; 358/56
[58] Field of Search ...................... 358/56, 59, 60, 64, 358/236, 240

[56] References Cited

U.S. PATENT DOCUMENTS

4,491,863  1/1985  Kurahashi ............................ 358/59

FOREIGN PATENT DOCUMENTS

7505557  11/1975  Netherlands ......................... 358/59
1439810   6/1976  United Kingdom .................. 358/56

*Primary Examiner*—James J. Groody
*Assistant Examiner*—Randall S. Svihla
*Attorney, Agent, or Firm*—Sherman and Shalloway

[57] ABSTRACT

A system of signal application to color picture elements of a color display apparatus of the matrix-drive type in which a unit displaying picture element is formed of one red, one blue and two green picture elements and drive signals are applied to unit driving picture elements which is formed by dividing each unit displaying picture element into at least two groups of picture elements whereby a color picture display of high resolution and high picture quality is accomplished.

3 Claims, 20 Drawing Figures

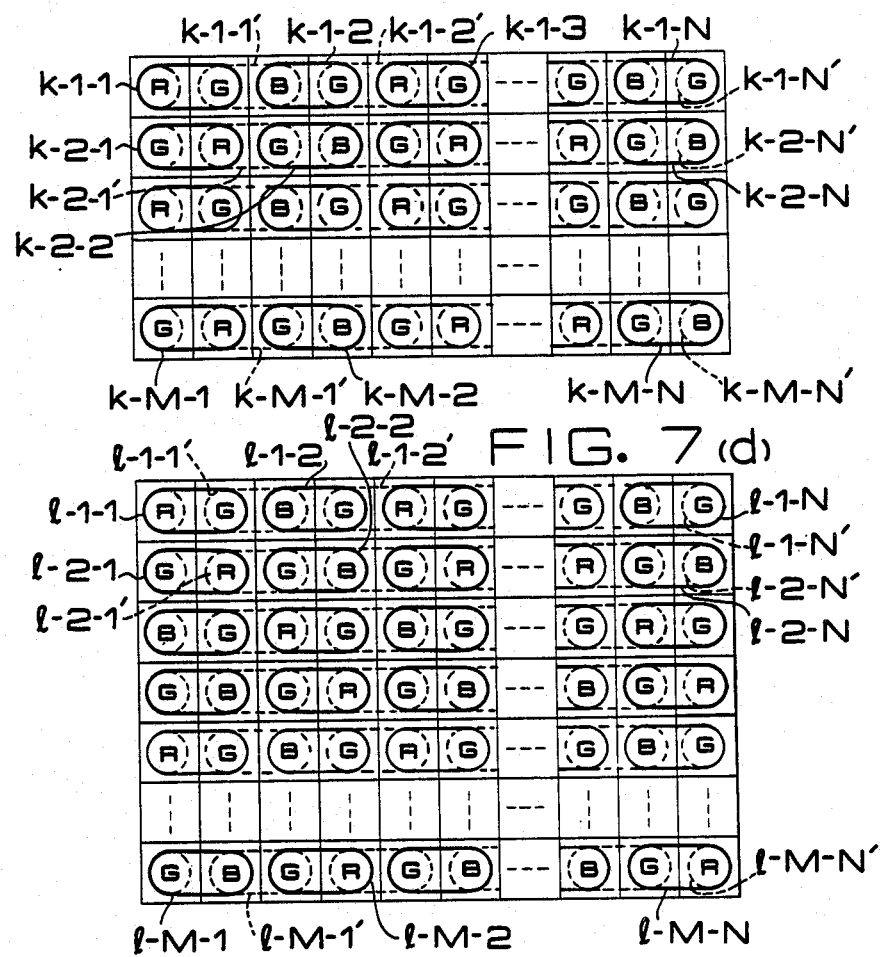
FIG. 7(c)
FIG. 7(d)
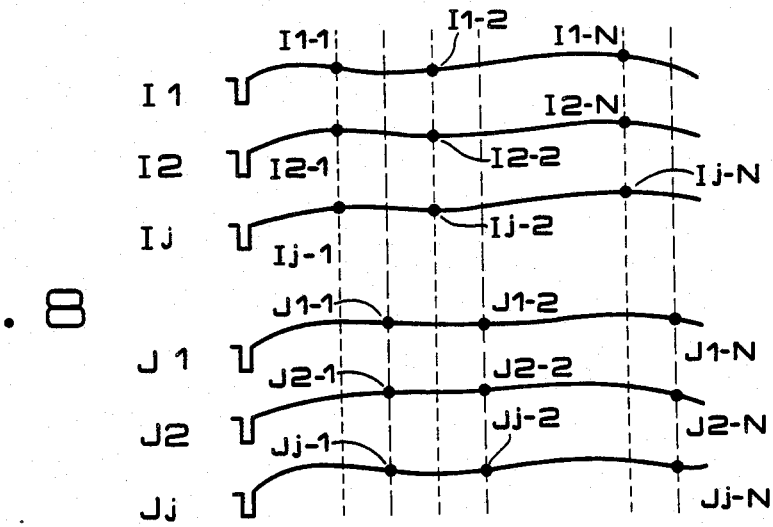
FIG. 8

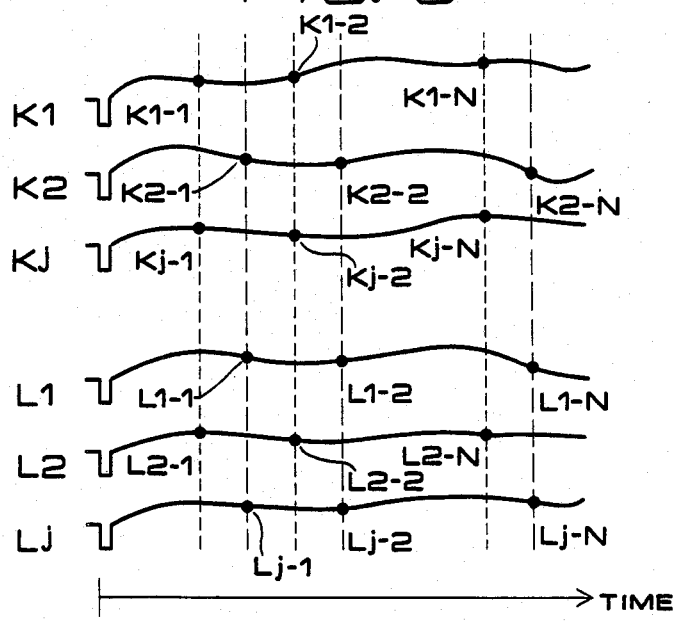

MATRIX-TYPE COLOR PICTURE DISPLAY APPARATUS WITH FOUR-ELEMENT UNIT DISPLAYING PICTURE ELEMENTS EACH BEING DIVIDED INTO AT LEAST TWO UNIT DRIVING PICTURE ELEMENTS

BACKGROUND OF THE INVENTION

1. Field of the Invention

The present invention relates to a color picture display apparatus and, particularly, to a system of signal application to color picture elements of a color display apparatus of matrix-drive type.

2. Description of the Prior Art

FIG. 1 shows an example of the conventional matrix-drive type color picture display apparatus. In the figure, symbols R, G and B represent three kinds of picture elements which are emissive in red, green and blue, respectively, in response to respective signals applied thereto. Each picture element is formed of coloring material such as an emissive layer of a light emitting diode layer, electric field emissive layer, plasma emissive layer or fluorescent emissive layer, or a non-emissive layer such as a liquid crystal layer, electrochromic layer or PLZT layer. A red picture element, a green picture element and a blue picture element in combination constitute a unit picture element, and a number of unit picture elements are disposed in a two-dimensional space to form a matrix-drive type color picture display panel.

A system of signal application to the unit picture elements for displaying a television picture will first be described using video signal waveforms shown in FIG. 2. In FIG. 2, video signals A1, A2, ..., and Aj are used to form an odd numbered field, while video signals B1, B2, ..., and Bj are used to form an even numbered field. The negative pulse located at the left end of each video signal is the horizontal synchronizing pulse in the television signal.

First, a set of three-color information is sampled at a timing of A1-1 in the video signal A1, and drive signals for each color are produced through the signal conversion and applied to red, green and blue picture elements of a unit driving picture element 1-1. Subsequently, at a timing of A1-2, another video information is sampled and the corresponding drive signals are applied to a unit driving picture element 1-2. In this way the video signal A1 is applied to a series of unit driving picture elements. In summary, video signals Aj are applied to unit driving picture elements j-i, where $1 \leq j < M$ and $1 \leq i < N$.

Following the odd numbered field, video information is sampled in video signals Bj for the even numbered field at timings Bj-i, and the corresponding signals are applied to unit driving picture elements j-i, where $1 \leq j < M$ and $1 \leq i < N$.

The foregoing conventional system has a drawback of low resolution, since the resolution of displayed picture is determined by the unit picture element which needs three color picture elements.

To display a television picture clearly, the display apparatus needs to have a performance of high resolution, and one system of attaining this is to increase the number of picture elements in the horizontal direction. However, the increase in the number of horizontal picture elements results in the following disadvantages.

(1) The number of external connections increases in proportion to the increase in the horizontal picture elements, causing an increased packaging cost and lowered reliability of connection.

(2) Increase in the number of picture elements for a fixed panel size needs the reduction in the size of picture element, and the lowered aperture factor causes the reduction in the display intensity and thus the degraded picture quality.

(3) The increased distance between adjacent picture elements causes the increased electrical leakage at the spacing, resulting in a lowered yield of display panel and thus in the increased production cost.

In order to overcome the foregoing deficiencies, there has been proposed a system of improving the resolution through the formation of a unit displaying picture element using one red picture element, one blue picture element and two green picture elements, instead of using red, blue and green picture elements.

SUMMARY OF THE INVENTION

It is an object of the present invention to provide a color picture display apparatus with improved system of signal application to color picture elements, so that high picture quality and high reslolution display is achieved.

According to this invention, a color picture display apparatus has a display panel on which unit displaying picture elements, each consisting of one red, two green, and one blue picture elements, are arranged regularly. An input picture information signal is sampled at a certain time and a set of color drive signals produced from the sampled signal is applied to a set of picture elements constituting a unit driving picture element.

The unit displaying picture element is divided into at least two unit driving picture elements.

In the formation of a unit displaying picture element using red, green, blue and green picture elements, the green picture element may be made to have the area half that of the red (blue) picture element, or may be made to have substantially the same area as of the remaining picture elements, and this invention is effective for both cases.

The coloring material may be either of an emissive layer or non-emissive layer as mentioned in the conventional arrangement.

BRIEF DESCRIPTION OF THE DRAWINGS

FIGS. 3(a)–3(h), 7(a)–7(d) and 10 are diagrams which are used to explain the arrangement of unit displaying picture elements and unit driving picture elements according to the present invention; and FIGS. 4, 5, 6, 8, and 9 are timing charts showing the information sampling time according to the present invention.

DETAILED DESCRIPTION OF THE PREFERRED EMBODIMENTS

Several embodiments of the present invention will now be described with reference to the drawings.

Embodiment 1

Figure 1:
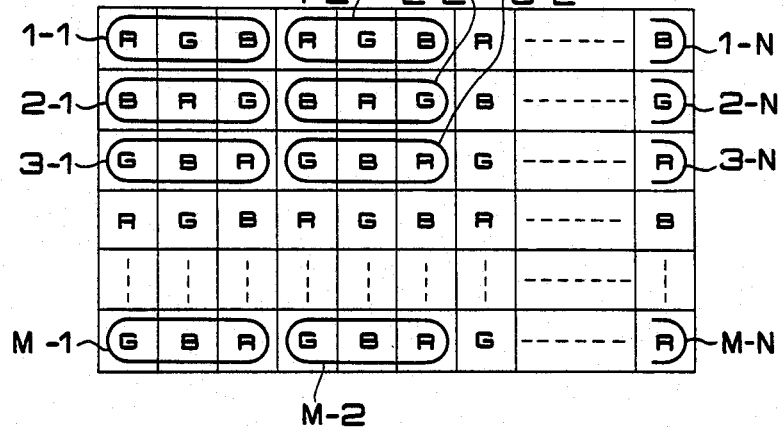
FIG. 1 is a diagram showing the conventional arrangement of unit displaying picture elements and unit driving picture elements.
Figure 2:
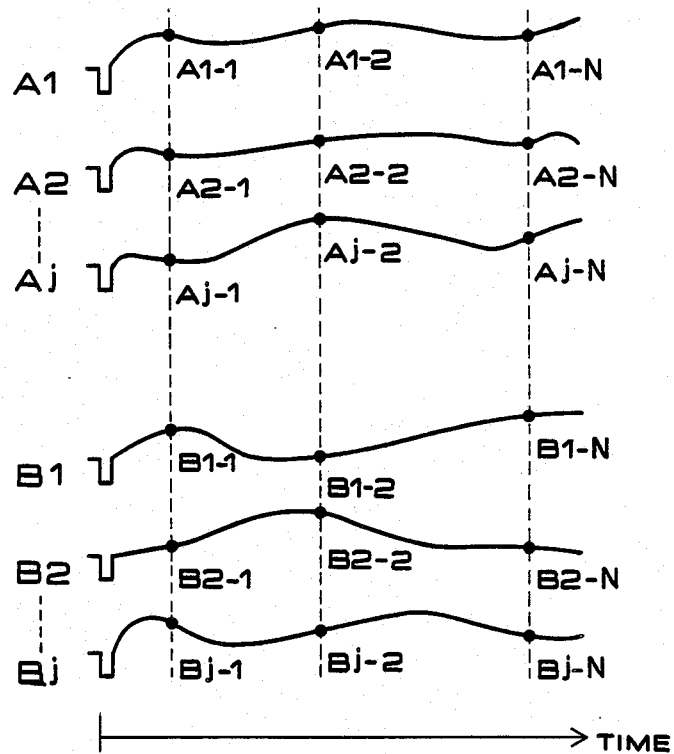
FIG. 2 is a timing chart showing the conventional information sampling time.
Figure 3:
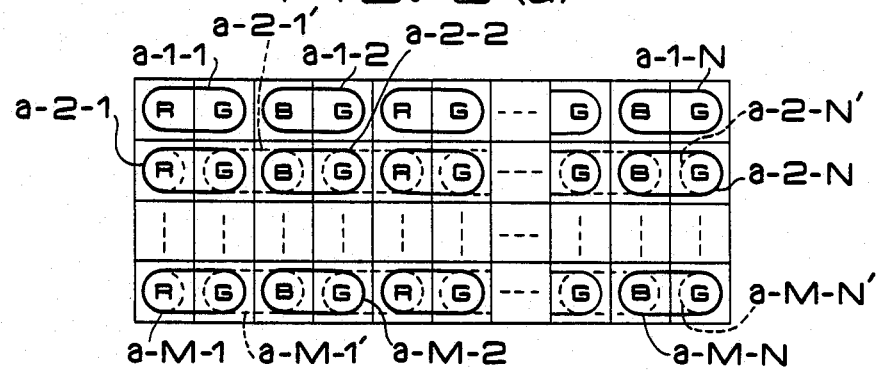
Figure 3:
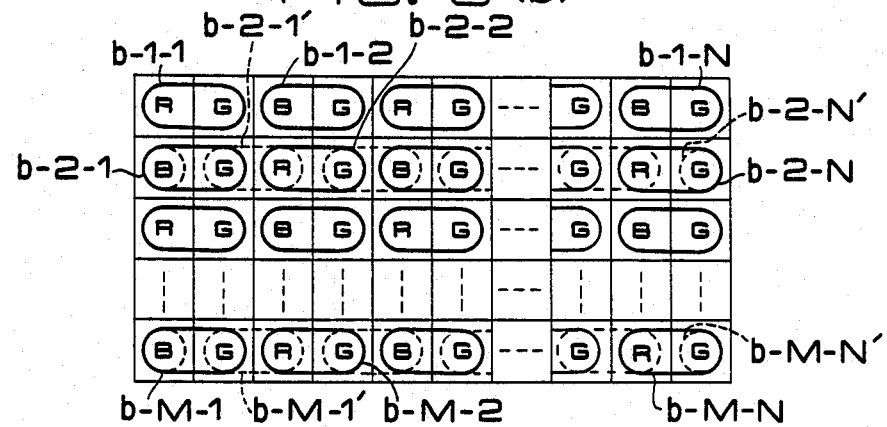
Figure 3:
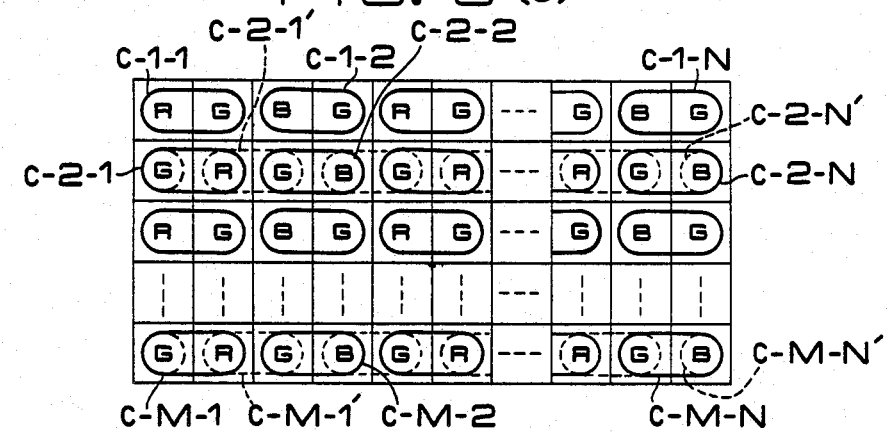
Figure 3:
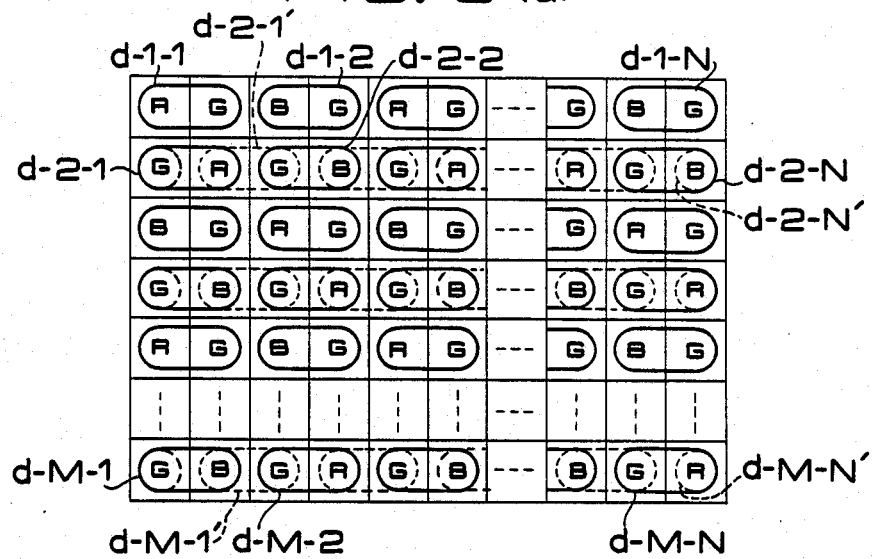
Figure 3:
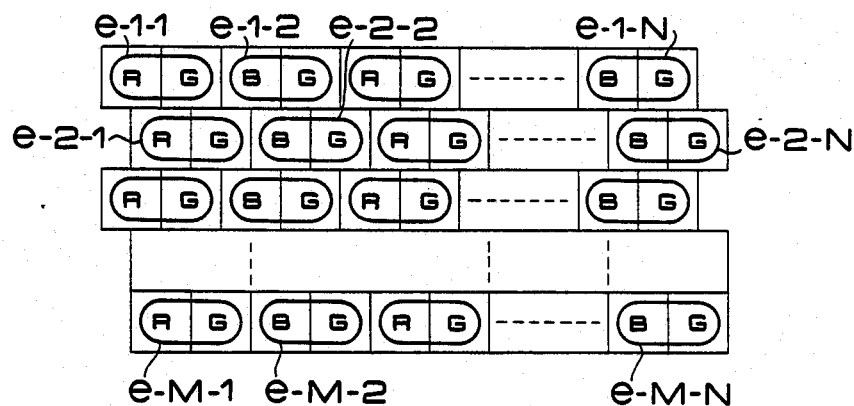
Figure 3:
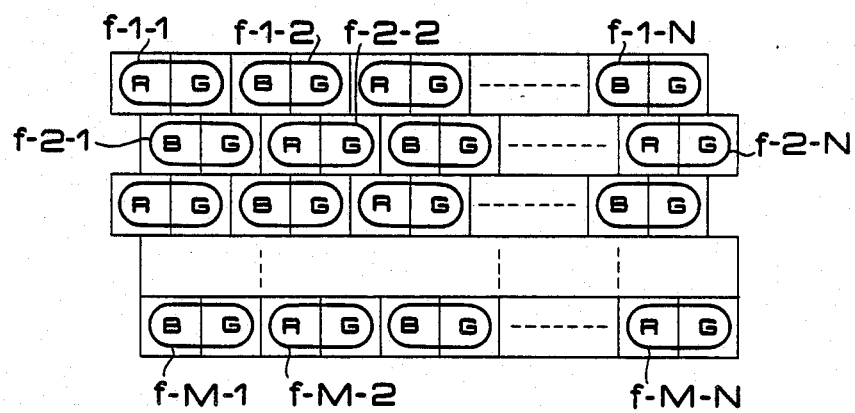
Figure 3:
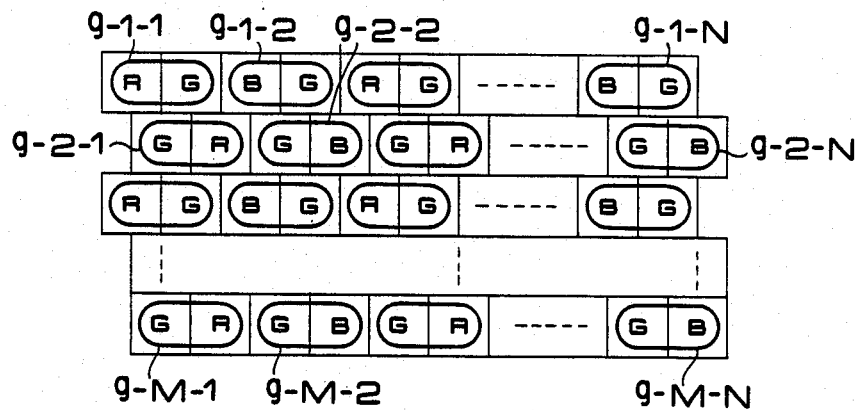
Figure 3:
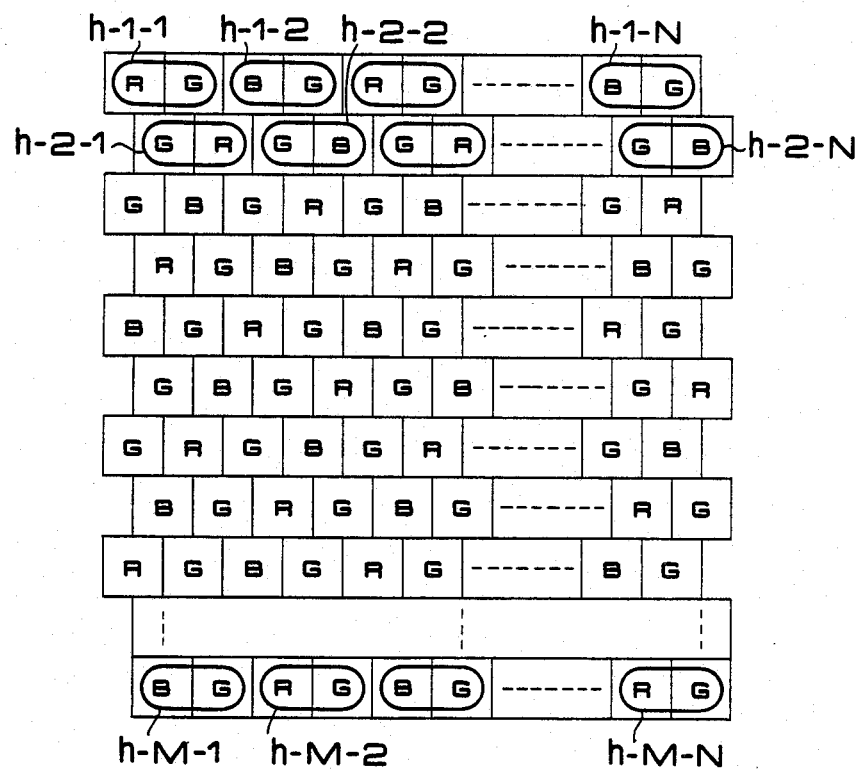
Figure 4:
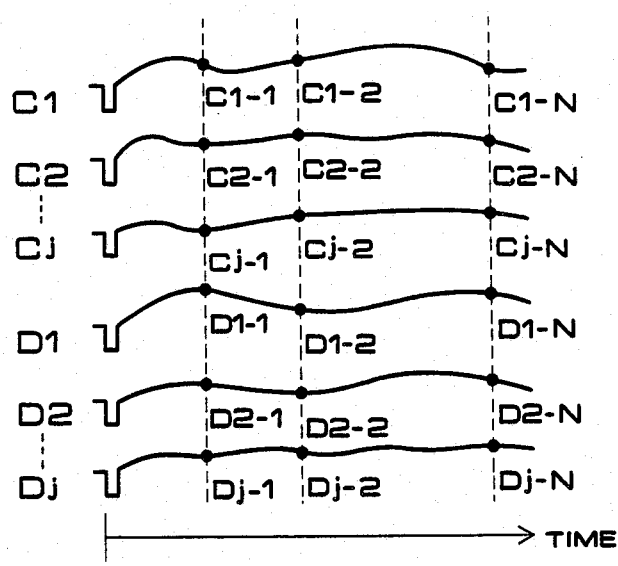

FIGS. 3(a)–3(h) shown the arrangement of color picture elements, and FIG. 4 shows the timing of sampling information in the video signal. FIG. 3(a) is the vertical stripe arrangement for all of red, green and blue picture elements, FIG. 3(b) the vertical stripe arrangement for green picture elements only, FIG. 3(c) is the vertical staggered arrangement for all of red, green and blue picture elements, and FIG. 3(d) is the diagonal stripe arrangement for all of red, green and blue picture elements. FIG. 3(e) is a modified version of FIG. 3(a), in which even-numbered horizontal element lines are shifted horizontally by a half pitch. FIG. 3(f) is a modified version of FIG. 3(b), in which even-numbered horizontal element lines are shifted horizontally by a half pitch. FIG. 3(g) is a modified version of FIG. 3(e), in which even-numbered horizontal element lines are shifted horizontally by a half pitch. FIG. 3(h) shows a further example of a modifed arrangement falling within the purview of the present invention wherein even-numbered horizontal element lines are shifted horizontally by a half pitch.

FIG. 4 shows the waveform of the video signals Cj and Dj, which include a horizontal synchronizing pulse of negative polarity as shown at the left end of the waveform. The signals of group C are used to display an odd numbered field, while the signals of group D are used to display an even numbered field. Symbols Cj-1 and Dj-1 indicate the timing of sampling video information. Unit picture elements each made up of red, green, blue and green picture elements are divided into two types of unit driving picture element pairs, one pair consisting of a red and green picture element, another pair consisting of blue and green picture elements. The correspondence between the timing of video signals and the pairs of picture elements to which the signals are applied is as follows.

Information sampled at Cj-i and Dj-i for each color of picture elements forming a unit driving picture element is converted into drive signals of each color and applied to picture elements of a unit driving picture element a(b, c, d)-j-i (FIGS. 3(a)–3(d)) separately for each color. For the point sequential drive system, a drive signal produced in response to a sampled information is immediately applied to a unit picture element, while for the line sequential drive system, drive signals produced for a line of information are applied at one time, as in the conventional system.

Embodiment 2

Figure 5:
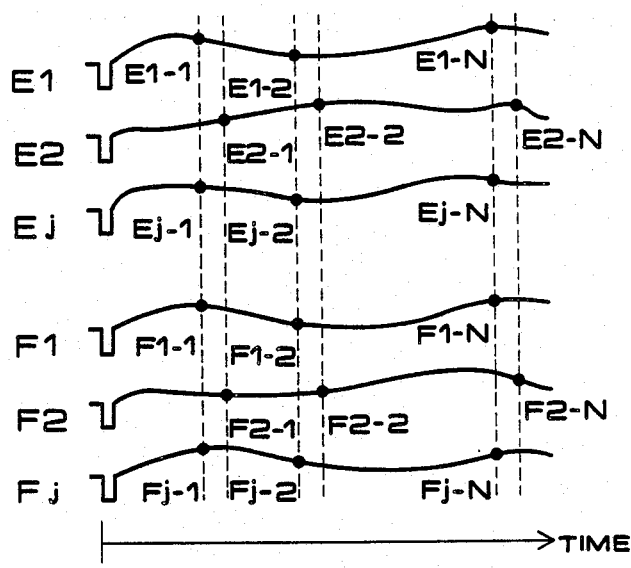

In this embodiment, the timing of sampling information in the video signal is shifted at every horizontal line of picture elements. The arrangement of color picture elements is as shown in FIGS. 3(e)–3(h). FIG. 5 shows the timing of sampling information in the video signal. Assuming the signals of group E to be odd-numbered field signals, the signals of group F are even-numbered field signals. The timing of sampling information is shifted by a quarter of the sampling period.

Information sampled at Ej-i and Fj-i for each color of picture elements forming a unit driving picture element is converted into drive signals of each color and applied to picture elements of a unit driving picture element e(f, g, h)-j-i (where $1 \leq i < N$ and $1 \leq j < M$). In all of the following embodiments, the same conditions $1 \leq i < N$ and $1 \leq j < M$ are applied.

Embodiment 3

Figure 6:
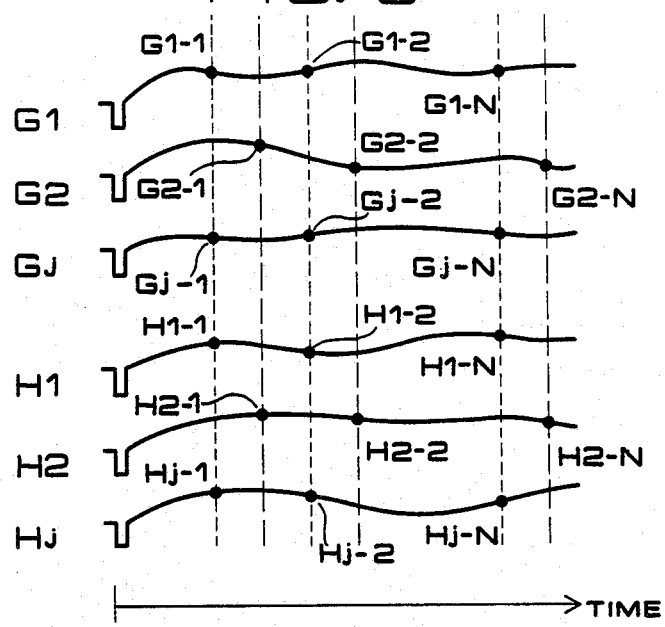
Figure 7A:
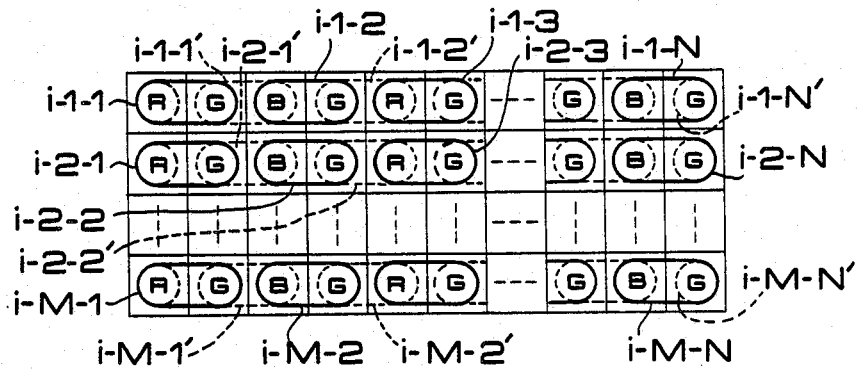
Figure 7B:
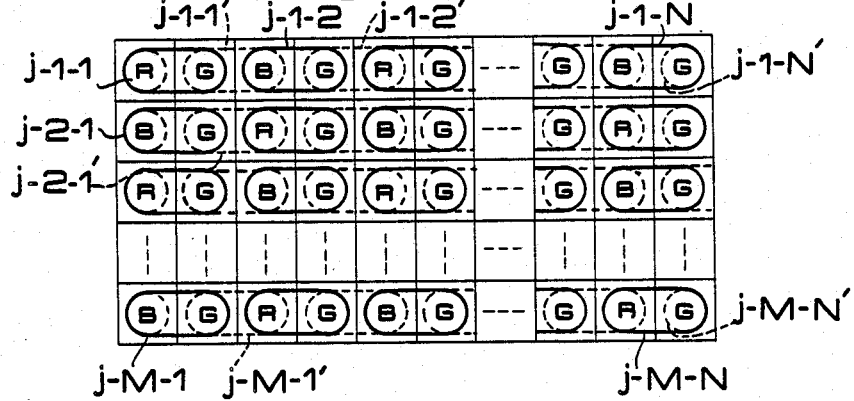

This embodiment is the case where the timing of sampling information is shifted by a half of the sampling period. FIG. 6 shows the timing of sampling information in the video signal.

The signals of group G and group H are the video signals of two consecutive fields. Information sampled at Gj-i and Hj-i (where j is an odd number) independently of each color is formed into drive signals, and they are applied to picture elements of a unit driving picture element a(b, c, d)-j-i (FIGS. 3(a)–3(d)) independently of each color. From information sampled at Gj-i and Hj-i (where j is an even number), drive signals are produced and applied to a unit driving picture element a(b, c, d)-j-i'.

Embodiment 4

This embodiment alters the combination of picture elements forming a unit displaying picture element. FIGS. 7(a)–7(d) show the arrangement of the unit driving picture element, in which the combination is switched between that indicated by the solid circle and that indicated by the dashed circle. The correspondence between the timing of sampling information in the video signal and the combination of color picture elements is as follows. Video information of each color forming a unit driving picture element is sampled at Cj-i in FIG. 4 to produce drive signals of three colors, and they are applied to picture elements of a unit driving picture element i(j,k,p)-j-i independently of each color. Drive signals produced from information sampled at Dj-i are applied to a unit driving picture element i(j,k,l)-j-1'.

Embodiment 5

Drive signals produced from video information sampled at Ej-i in FIG. 5 are applied to a unit driving picture element m-j-i, and drive signals produced from video information sampled at Fj-i are applied to a unit driving picture element.

Embodiment 6

Drive signals produced from video information sampled at Gj-i (where j is an odd number) in FIG. 6 are applied to a unit driving picture element k(l)-j-i, and drive signals produced from video information sampled at Gj-i (where j is an even number) are applied to a unit driving picture element k(l)-j-i'.

Drive signals produced from video information sampled at Hj-i (where j is an odd number) are applied to a unit driving picture element k(l)-j-i, and drive signals produced from video information sampled at Hj-i (where j is an even number) are applied to a unit driving picture element k(l)-j-i'.

Embodiment 7

The timing of sampling information in the video signal is shown in FIG. 8. Signals of group I and signals of group J are video signals of consecutive fields. In this embodiment, the timing of sampling for each field is shifted by a half sampling period.

Drive signals produced from information sampled in the input video signals of each color at Ij-i are applied to picture elements of a unit driving picture element i(j,k,l)-j-i independently of each color. Drive signals produced from information sampled at Jj-i are applied to a unit driving picture element i(j,k,l)-j-i'.

Embodiment 8

FIG. 9 shows the timing of sampling information. Signals of group K and signals of group J are video signals of consecutive fields.

The timing of sampling is shifted by a half sampling period at every horizontal sync pulse, and the timing is further shifted by a half sampling period at every field. Information sampled in the video input signals of each color at Kj-i is converted independently of each color into drive signals, and they are applied to picture elements of a unit driving picture element i(j,k,l)-j-i independently of each color. In the same way, information sampled at Lj-i is converted into drive signals, and they are applied to a unit driving picture element i(j,k,l)-j-i'.

Embodiment 9

This embodiment forms unit driving picture elements in combination of (R, G, B) and (G). A typical pattern arrangement is shown in FIG. 10. The timing of sampling video information is, for example, as shown in FIG. 6.

Information sampled in the input video signals for each color at Gj-i is converted into drive signals independently of each color, and they are applied to a unit driving picture element m-j-i. Information sampled at Hj-i is formed into drive signals in the same way, and they are applied to a unit driving picture element m-j-i'.

Another combination of color picture elements forming unit driving picture elements, such as (R, G) and (B, G) is also effective. For the patterns of picture elements with a shift of half pitch as shown in FIGS. 3(e)-3(h), the concepts of Embodiments 6, 8 and 9 are of course effective.

Although in the foregoing embodiments the alteration of sampling time and switching of unit driving picture element take place at every field, resulting in a 50% duty cycle, other duty cycle than 50%, where switching takes place at every variable number of fields, is also effective.

The following describes the details of the picture element for the case, as an example, where the liquid crystal layer is used. A liquid crystal layer of TN mode, black GH mode or the like is formed between two pieces of substrate on a background light source, and patterns of red, green and blue filters are disposed between the liquid crystal layer and the light source, or between the liquid crystal and eyes. The liquid crystal layer is driven in any matrix driving system such as passive matrix driving or active matrix driving using an active substrate incorporating transistors or diodes.

According to the present invention, as described above, a unit displaying picture element is formed of red, green, blue, and green picture elements, and drive signals are applied to each unit driving picture element which is formed by dividing a unit displaying picture element into combinations of picture elements, whereby a color display apparatus of high resolution and high picture quality is accomplished.

What is claimed is:

1. A matrix-type color picture display apparatus comprising:
    a plurality of unit displaying picture elements disposed in a two-dimensional array;
    said unit displaying picture elements each consisting of one red display element, one blue display element, and two green display elements;
    said display elements of each of said unit displaying picture elements being divided into at least two groups, at least one of said groups comprising at least two display elements, to form at least two unit driving picture elements;
    a luminous intensity of each of said red, green, and blue display elements being controlled independently in response to respective red, green, and blue drive signals;
    said red, green, and blue drive signals being obtained by converting video signal samples into said red, green, and blue drive signals;
    said video signal samples being obtained by sampling a video signal at time intervals corresponding to spatial locations of said unit driving picture elements in said two-dimensional array;
    wherein said red, green, and blue drive signals are applied to corresponding red, green, and blue display elements of said unit driving picture elements such that drive signals applied to a given unit driving picture element are derived from a video signal sample corresponding to the spatial location of said given unit driving picture element in said two-dimensional array.

2. A matrix-type color picture display apparatus according to claim 1 wherein said display elements of each of said unit displaying picture elements are divided into two groups, one group consisting of a red display element and a green display element, and the other group consisting of a blue display element and a green display element.

3. A matrix-type color picture display apparatus according to claim 1 wherein said display elements of each of said unit displaying picture elements are divided into two groups, one group consisting of a red display element, a green display element, and a blue display element, and the other group consisting solely of a green display element.

* * * * *